Jan. 15, 1929.
R. E. BISSELL
1,699,273
METHOD OF MAKING VALVES
Filed Feb. 8, 1928
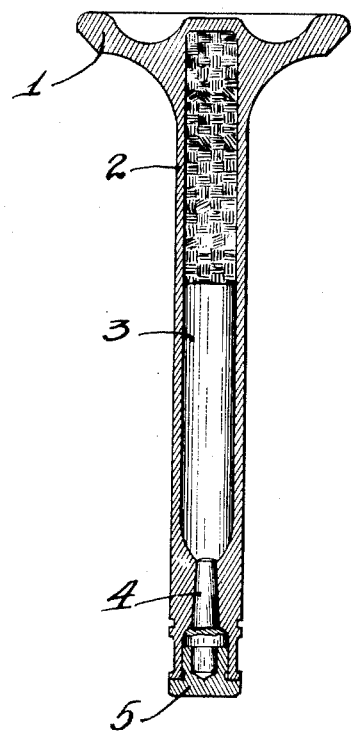
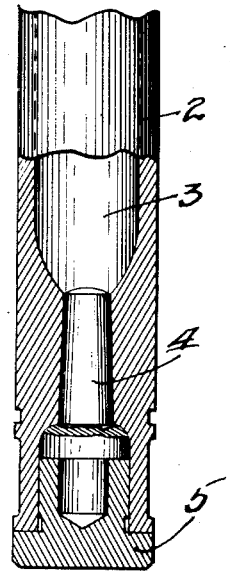
Inventor
Richard E. Bissell
by Charles Hills
Attys Patented Jan. 15, 1929.

1,699,273

UNITED STATES PATENT OFFICE.

RICHARD E. BISSELL, OF CLEVELAND HEIGHTS, OHIO, ASSIGNOR TO THOMPSON PRODUCTS, INC., A CORPORATION OF OHIO.

METHOD OF MAKING VALVES.

Application filed February 8, 1928. Serial No. 252,912.

This invention relates to automobile valves, more especially exhaust valves which are subjected to high temperatures due to the passage of the hot products of combustion therearound.

The object of this invention is to provide a valve and method of making the same which will be more satisfactory in use and more easily constructed than those heretofore made.

The valve head and the upper part of the stem must be capable of withstanding the corrosive action of the hot gases and also must retain sufficient hardness at the temperatures reached in operation to withstand wear and distortion. Further, the critical points of the alloy must be above the highest temperature reached by the valve head to avoid the sudden changes in volume which occur at such critical points.

While certain alloys have greater resistance to the corrosion of hot gases and also possess greater "red-hardness" than others, it is desirable with any alloy to reduce the temperature of the head and the upper part of the valve stem as far as possible, as resistance to corrosion never increases with temperature.

To decrease the head temperature, valves have been made hollow for the reception of material which is fluid under operating temperatures, such as various salts, for example, sodium and/or potassium nitrates or metallic sodium or potassium.

The first mentioned materials are hygroscopic and will absorb water from the atmosphere under ordinary humidity conditions. Further, metallic sodium and potassium oxidize and decompose water with great avidity. In view of these facts, it is advisable to seal the chamber containing such materials as soon as practicable.

Further, as heretofore constructed, a certain proportion of such valves are defective in that the seal is not complete and the salt or other filling material oozes out of the valve stem.

This fact not only causes a number of valves to be rejected, thereby reducing manufacturing efficiency, but also necessitates the testing out of each and every valve to ascertain whether the sealing of the valve stem chamber is complete.

While early and more universally satisfactory sealing of the valve chamber is especially important where hygroscopic salts or substances such as metallic sodium or potassium are used, it is also advantageous where cooling of the valve head is brought about by a rod or tube of copper or other material of high heat conductivity within the valve stem.

So far as the main part of the valve stem is concerned, the chief requirement is not heat resistance but wear resistance. While the head and upper part of the stem are cooled only by conduction along the stem, aided in the case of salt cooled valves, by transference of heat by the molten salt, the middle and lower part of the stem is kept at a much lower temperature than the head by direct conduction of heat away to the valve guides and external air surrounding the lower part of the stem.

The frictional contact between the valve stem and its guide produces wear not present in the case of the valve head. Hence the stem requires greater surface hardness to resist wear.

Steel may be surface case-hardened by heating in contact with carbon but the temperatures required for such cementation are so high that warpage results and, moreover, undue pressure is created in the interior of salt cooled valves. Greater hardness without warpage or the creation of undue internal pressure or decomposition of the salts used may, however, be obtained by means of nitriding. This process consists in heating the articles in an atmosphere of ammonia to a temperature of around 900° F. for a time varying from 3 to 100 hours. This nitriding process results in a slight expansion of the surfaces exposed to the action of the ammonia and hence if there should be any interstices around the closure of the stem chamber, the latter will ordinarily be closed as the result of the nitriding treatment.

According to the present invention, therefore, this nitriding treatment is made to fulfill a variety of purposes. First the hardening of the exterior of the valve stem, second the closing of incomplete stem chamber seals and third the final testing of the completeness of the seal.

Other and further important objects of this invention will be apparent from the disclosures in the accompanying drawings and the following specification.

The invention (in a preferred form) is illustrated on the drawings and hereinafter more fully described.

On the drawings:

Figure 1 is a longitudinal central section through a valve constructed in accordance with the present invention.

Figure 2 is a sectional view of the lower end of the valve stem on an enlarged scale.

As shown on the drawings:

The valve comprises a head 1 and stem 2. The first step in making the valve consists in producing a forging of substantially the requisite size plus allowance for machining, except at the foot of the stem which is of larger diameter than the remainder. The stem is then drilled to form the chamber 3 and then the entrance to such chamber is closed or nearly so by swaging the enlarged foot of the stem. The entrance to the chamber is then drilled out for the reception of a closure plug 4 which may be screwed in, or, as shown, merely a tapered plug driven into place. The space beyond this plug is drilled or machined for the reception of a hardened steel tip 5.

Before the plug 4 is inserted, the requisite amount of fusible salt or the like 6 is inserted in the chamber 3, usually by inserting a measured amount of salt through a funnel although it may be accomplished by filling the chamber to the brim and then inserting a rod to displace the excess over what is desired.

After the valve has been filled, the plug 4 is inserted and silver soldered in position; then the tip 5 is inserted and next the valve stem and tip is nitrided. This treatment is carried out at about 900° F. and continued for about 90 hours. The temperature of treatment should be carefully controlled.

It may be found that with some alloys, the temperature should be somewhat higher or lower than 900° F. and no absolute figure suitable for all conditions and/or alloys can be given.

The degree of hardening produced by the nitriding treatment is dependent to a large extent upon the composition of the alloy used to make the valve. Of the various possible ingredients of the steel used, aluminum has thus far shown to aid the hardening more than any other. Chromium is another ingredient which is highly useful in this respect.

I have found that very satisfactory results are obtained by the use of an alloy having the following composition:—

| | Per cent. |
|---|---|
| Chromium | 7 to 9 |
| Aluminum | 0.30 to 0.90 |
| Molybdenum | 0.50 to 0.90 |
| Silicon | 1.50 to 1.75 |
| Carbon | 0.50 to 0.60 |
| Iron | Balance |

The hardening effect produced by heating alloys in an atmosphere of ammonia is due to the formation of metallic nitrides which have a larger volume than the original metal so that there is an increase in size of about 0.003 inch as the result of the nitriding treatment. This increase in size causes any surface cracks to be closed. Hence, when nitriding is performed after the tip 5 has been inserted, any cracks between such tip and the valve stem will be closed and so two hermetically sealed closures for the stem chamber are provided.

The absence of warpage as a result of the nitriding treatment is due to the fact that the temperatures employed are far below the critical points of the alloys used.

I am aware that numerous details of construction or method of making my improved valve may be varied in many ways without departing from the spirit of this invention and I therefore do not purpose limiting the patent granted otherwise than necessitated by the prior art.

I claim as my invention:

1. A method of making valves including forming a valve head and stem, drilling the stem from the foot end to form a chamber adapted to receive cooling means, inserting said cooling means, hermetically closing said chamber at a distance from the end of the stem and inserting a plug into the exposed end portion of the bore of said stem.

2. A method of making valves including forging the head and stem, with an enlargement at the foot of the stem, drilling the stem to form a chamber adapted to receive cooling means, swaging enlarged end of valve stem to reduce diameter of bore, machining reduced portion of bore to receive a plug, inserting said cooling means, inserting such plug, sealing said plug hermetically to close the chamber within the stem and inserting a second plug into that portion of the bore of the stem which extends beyond the first plug.

3. A method of making valves including forming a valve head and stem, drilling the stem from the foot end to form a chamber adapted to receive cooling means, inserting said cooling means, hermetically closing said chamber at a distance from the end of the stem, inserting a plug into the exposed end portion of the bore of said stem, and nitriding the stem and said plug.

In testimony whereof I have hereunto subscribed my name.

RICHARD E. BISSELL.